Jan. 16, 1940.　　　　E. B. MERRIMAN　　　　2,187,626
SELF-LUBRICATING BEARING
Filed July 2, 1938
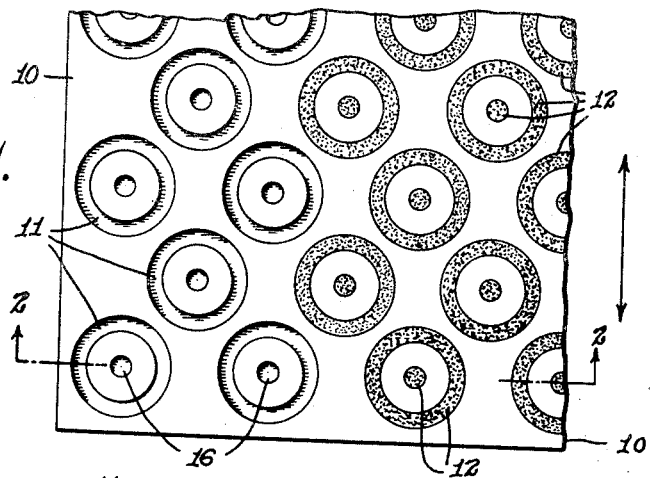
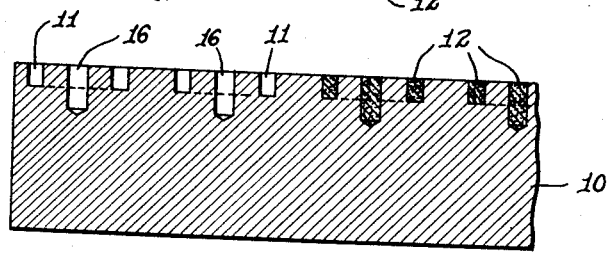
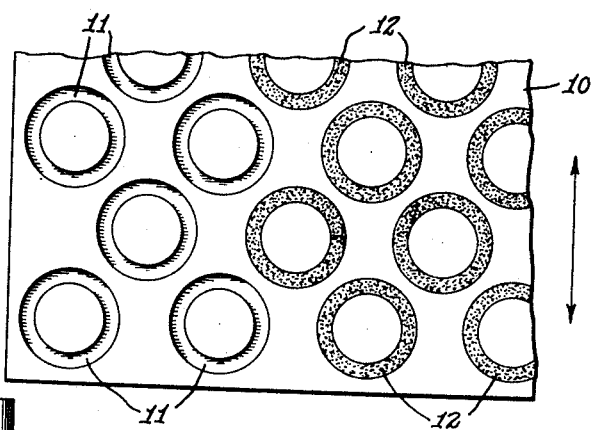
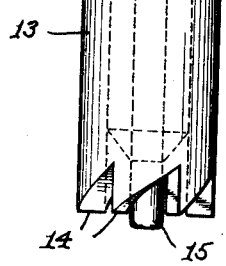
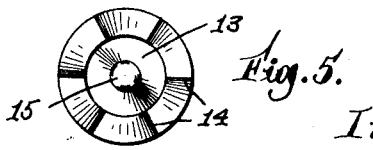
Inventor
EDWARD B. MERRIMAN
by E. D. Chadwick
Attorney Patented Jan. 16, 1940

2,187,626

UNITED STATES PATENT OFFICE 2,187,626

SELF-LUBRICATING BEARING

Edward B. Merriman, Cambridge, Mass., assignor to Merriman Brothers, Incorporated, Boston, Mass., a corporation of Massachusetts Application July 2, 1938, Serial No. 217,239

2 Claims. (Cl. 308—239)

My invention relates to metal bearings which are self-lubricated by means of a solid lubricant contained in spaced pockets formed in the surface of the bearing, and is particularly applicable to expansion plates such as are used to carry the ends of bridge spans and provide for their expansion and contraction resulting from the changes in temperature to which they are subjected.

The lubrication of a bearing of the type above referred to depends upon the spreading of a thin coating of the lubricant over the metal surface between the pockets, which overlap laterally and preferably occupy, collectively, from ten to thirty per cent of the total surface area of the bearing, and in these bearings as usually constructed heretofore the pockets are of a compact circular shape and the distance between consecutive pockets is much greater than their diameter. Such pockets, however, are unsuitable for use in an expansion plate, for the reason that the range of the reciprocating movement of the span carried by the plate is so slight that the lubrication will be incomplete, and correspondingly inefficient, unless the consecutive pockets are so close together that their aggregate area is excessive. My invention overcomes this difficulty by the provision of a bearing in which the pockets of lubricant are given a novel configuration that enables them to be located as close to one another as the conditions to be met may require, while still keeping their aggregate area within permissible limits.

In the accompanying drawing,

Figure 1 is a plan view of a portion of a bearing embodying my invention in its preferred form, as designed for use as an expansion plate for bridge spans;

Figure 2 is a section on the line 2—2 in Figure 1;

Figure 3 is a plan view similar to Figure 1 but illustrating a modification;

Figure 4 is a side elevation of a tool for use in the manufacture of the bearing shown in Figures 1 and 2; and Figure 5 is a face view of the cutting end of the tool shown in Figure 4.

The bearing illustrated in the drawing comprises a metal plate 10, preferably made of bronze, which is adapted to rest and be held in fixed position on a bridge pier or other supporting structure and has a flat top surface on which the complementary member of the bearing moves back and forth. In the case of a bridge span, this complementary member will ordinarily consist of a steel shoe secured to one end of the span and having a flat under surface of about the same area as the top surface of the plate 10, such shoes being well known and constituting no part of my invention.

The plate 10 may have any desired dimensions, according to the weight of its intended load, and its top surface is provided with pockets 11 hereinafter described in detail. These pockets are filled with a lubricating material 12 in solid form, which may be any of the lubricants already in common use in self-lubricating bushings.

The pockets 11 differ from the compact circular pockets heretofore employed, in that they have an annular contour which gives the lubricant the form of bands having a substantial linear dimension but relatively narrow, thereby making it possible to locate adjacent pockets in overlapping relation both in the direction in which movement on the bearing takes place and transversely to that direction, as shown, and in such proximity to one another that the range of the movement is sufficient to cover the intervening metal areas without requiring the area of the collective pockets to be increased beyond what is customary. In other words, the result is equivalent to expanding the effective area of the lubricant, without increasing its actual area, to such an extent that the spreading movement suffices to distribute the lubricant over the entire metal surface of the bearing and thereby secure maximum efficiency.

The annular pockets shown in Figures 1 and 3 may be readily formed by a boring operation using a cylindrical tool with a ring of cutting teeth on one end, like a trepan, such a tool being illustrated in Figures 4 and 5, in which 13 indicates the body of the tool and 14 indicates its cutting teeth. In order to locate the tool accurately and steady it during the boring operation, I prefer to provide it with a central pin 15 extending a short distance beyond the teeth 14 and adapted to enter and be guided by a hole 16 drilled in the plate 10, Figures 1 and 2, at the center of each pocket 11, these holes being drilled as a first step in the formation of the pockets. Their depth is sufficient to permit the pockets 11 to be given the desired depth, and eventually they are filled with the lubricant, which contributes to the coating of the metal surface within the pockets 11 and is taken into account in determining the total surface area of lubricant to be employed.

Bridge plates are best made of rolled bronze or bronze alloy, in which the lubricant pockets have to be formed by boring operations, and since the machining of this material is expensive on account of its density and toughness, one of the advantages resulting from my invention is that the employment of annular pockets enables such plates to be constructed with a minimum number of pockets, as compared with any other arrangement of bored pockets which will give complete lubrication without unduly increasing the surface area of the lubricant in relation to the area of the exposed metal surface.

The annular pockets, however, may obviously be employed in bearings made in various ways or used for various purposes, or having other than flat surfaces, and if they are formed in curved surfaces the use of a steadying pin on the boring tool, as described above, is particularly advantageous in preventing side play of the tool. It will also be evident that the width as well as the diameter of the pockets may be varied and proportioned to produce any desired ratio between the area occupied by the collective pockets and the total area of the surface in which they are formed, without losing the benefit of the wide distribution of the lubricant which is made possible by giving it the form of relatively long and narrow bands.

I claim:

1. A self-lubricating bearing comprising a body portion provided with annular pockets which are filled with a solid lubricant and are spaced to overlap in the direction of movement on the bearing.

2. A self-lubricating bearing comprising a body portion provided with spaced pockets of annular shape and with a hole located at the center of each pocket and having a somewhat greater depth, said pockets and holes being filled with a solid lubricant.

EDWARD B. MERRIMAN.